(12) United States Patent
Castagner et al.

(10) Patent No.: US 7,073,819 B2
(45) Date of Patent: Jul. 11, 2006

(54) DEVICE FOR INDIVIDUAL PROTECTION, COMPRISING AN AIRBAG

(75) Inventors: Bernard Castagner, Coupvray (FR); Rémi Castagner, Coupvray (FR)

(73) Assignee: API, Paris (FR)

( * ) Notice: Subject to any disclaimer, the term of this patent is extended or adjusted under 35 U.S.C. 154(b) by 0 days.

(21) Appl. No.: 10/258,564

(22) PCT Filed: Apr. 25, 2001

(86) PCT No.: PCT/FR01/01265

§ 371 (c)(1),
(2), (4) Date: Feb. 19, 2003

(87) PCT Pub. No.: WO01/81128

PCT Pub. Date: Nov. 1, 2001

(65) Prior Publication Data
US 2003/0155758 A1    Aug. 21, 2003

(30) Foreign Application Priority Data
Apr. 25, 2000    (FR)  ................... 00 05335

(51) Int. Cl.
*B60R 21/26*    (2006.01)

(52) U.S. Cl. ............... 280/736; 2/456; 280/735; 280/741; 280/742; 280/730.1

(58) Field of Classification Search ................ 280/735, 280/730.1, 742, 736, 741, 739; 2/456, 465, 2/467, 468
See application file for complete search history.

(56) References Cited

U.S. PATENT DOCUMENTS

| 3,930,667 | A |   | 1/1976  | Osuchowski |
|-----------|---|---|---------|------------|
| 5,007,662 | A | * | 4/1991  | Abramczyk et al. ........ 280/739 |
| 5,219,179 | A | * | 6/1993  | Eyrainer et al. ............ 280/739 |
| 5,362,098 | A |   | 11/1994 | Guill |
| 5,441,300 | A | * | 8/1995  | Yokota et al. .............. 280/735 |
| 5,468,013 | A | * | 11/1995 | Gille .......................... 280/729 |
| 5,839,754 | A |   | 11/1998 | Schlüter |
| 6,032,299 | A |   | 3/2000  | Welsh |
| 6,139,050 | A |   | 10/2000 | Bultel |

FOREIGN PATENT DOCUMENTS

| EP | 0 925 730 | 6/1999 |
| GB | 1 524 022 | 9/1978 |

OTHER PUBLICATIONS

Derwent Abstract of EP 043 990.
Derwent Abstract of DE 40 05 768.
Derwent Abstract of DE 198 34 392.
Derwent Abstract of FR 2 650 189.

* cited by examiner

*Primary Examiner*—Eric Culbreth
(74) *Attorney, Agent, or Firm*—Patzik, Frank & Samotny Ltd.

(57) ABSTRACT

The invention concerns a protective device comprising an airbag worn by a person, a pyrotechnic gas generator for inflating the airbag, and an actuator for the gas generator. The invention is such that the gas generator has a dual state combustion. Preferably, the generator is single-piece with single ignition. The invention device enables to provide a first inflating phase lasting about 60 ms at most, preferably between 30 and 50 ms; then a second phase maintaining inflation lasting at least a few seconds, preferably at least 4 s, more preferably still between 5 and 8 s.

12 Claims, 5 Drawing Sheets

DEVICE FOR INDIVIDUAL PROTECTION, COMPRISING AN AIRBAG

FIELD OF THE INVENTION

Figure 1:
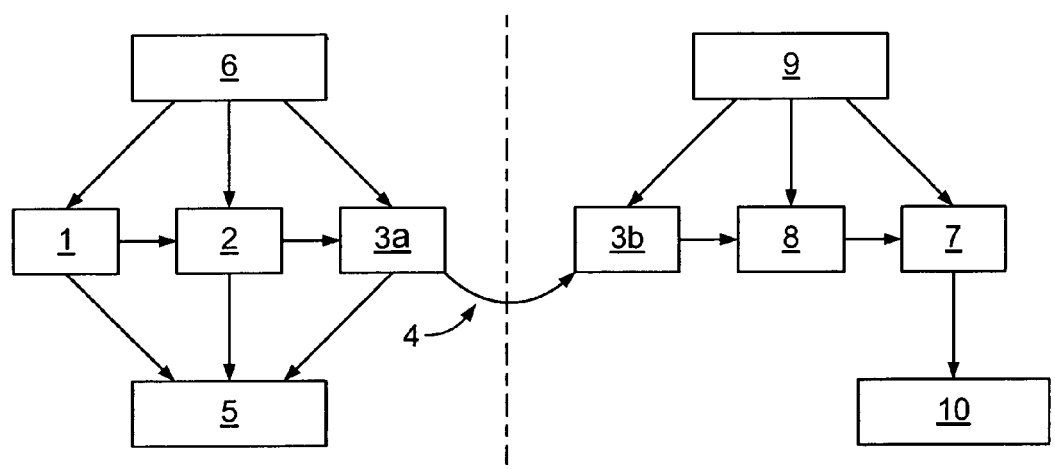

The present invention concerns a device for protecting a person, in particular the driver of a two-wheeled vehicle, comprising an airbag worn by the person.

BACKGROUND OF THE INVENTION

Given the increase in the number of users of two-wheeled vehicles and the number of serious accidents, the need to protect the motorcyclist in case of an accident has become a major concern. The compulsory wearing of a helmet in some countries has been one of the main decisions taken in this direction. However, progress can still be made.

Having seen the benefit of airbag protection in the automotive field, it has been sought to design and develop an equivalent device suitable to be worn by a person, and therefore in particular by the driver of a two-wheeled vehicle.

Various devices have been the subject of patent applications. Mention will be made by way of example of British patent GB 1 524 022, dating from 1974, which describes such a device for protection of a person, comprising an airbag. The inflation is provided by a single stage pyrotechnic gas generator, activated by a radio signal. Mention may also be made of European patent EP043990, which describes a protective device which is inflated by a cartridge of compressed gas, activated by breaking a wire link.

At the present time, some devices are marketed. They are of the type described in patent application EP043990 mentioned above, and may be characterized by the presence of an inflatable structure, of a small reservoir of pressurized gas whose opening makes it possible to inflate the inflatable structure, and of a wire connecting the motorcyclist to the motorbike and which activates the inflation when the motorcyclist is subject to a tensile force.

Several remarks, are called for. The devices currently on the market may be improved in terms of energy absorption without rebound. Furthermore, the inflation by opening a small reservoir of pressurized gas has four major drawbacks:
- the period of time for inflating the protective structure is high with respect to the speed with which the accident occurs and any contact of the motorcyclist with obstacles,
- the volume of the reservoir and of its activation system is high,
- the hardness of this reservoir may cause significant injuries even in the case of minor accidents,
- the continuous presence, throughout the equipment life, of this high-pressure reservoir against the body is not very reassuring.

Another drawback of the devices currently marketed is that the activation by tensile force on a wire is not desired by the motorcyclists, because it causes inadvertent operation of the device should the motorcyclist fall on stopping, or at low speed, or should the motorcyclist forget to disconnect the device when getting off the motorcycle.

Moreover, the pyrotechnic gas generators do not allow the airbag to be maintained under pressure during the several seconds needed to respond to the various accidental situations. This is because, under the effect of the rapid reduction in temperature of the gas after inflation, the pressure in the airbag decreases. Analyses of accidents show that it is necessary to inflate the protective structure very fast, 50 ms at most, then to maintain this inflated structure for several seconds. Fast inflation which is not maintained is not effective enough to allow the safety device to fulfil its role completely.

Thus, in spite of considerable research carried out in this field, and of the development of a certain number of devices containing an airbag, for more than twenty years, there remains a need for a protective device comprising an airbag worn by an individual, with both fast and maintained inflation. The Applicants have succeeded in developing such a device.

OBJECTS AND DESCRIPTION OF THE INVENTION

The present invention thus concerns a protective device comprising an airbag worn by a person, a pyrotechnic gas generator for inflating the airbag, and means for activating the gas generator, characterized in that the gas generator has a dual stage combustion. This dual stage gas generator firstly makes it possible to obtain rapid inflation of the airbag (1st stage), and secondly to maintain the airbag under pressure for the few seconds needed for optimum effectiveness of the device (2nd stage).

The term "pyrotechnic gas generator" refers to a generator allowing gas to be generated by combustion. In particular, a propellant can be used. The propellant used for the $1^{st}$ stage preferably has a low speed and low pressure of combustion, and the propellant charge is preferably in the form of continuous or plates embossed by knuckles, preferably plates embossed by knuckles, stacked and preferably held by bosses included in the body or the mouth of the chamber. The propellant charge of the $2^{nd}$ stage is preferably the same type as the propellant of the 1st stage, and is in the form of a rod included in an inhibitor.

In a preferred embodiment, the gas generator is monoblock piece with single ignition.

In a preferred embodiment, the dual stage gas generator of a device according to the invention is monoblock price and comprises a $1^{st}$ and a $2^{nd}$ combustion chamber, corresponding respectively to the $1^{st}$ and to the $2^{nd}$ combustion stages of the generator, each being equipped with a neck for regulating the flow rate.

The gas contained in the 1st combustion chamber and corresponding to the 1st combustion stage is preferably ignited by an electric igniter, and the gas contained in the 2nd combustion chamber and corresponding to the 2nd combustion stage is ignited by the hot gases generated by the combustion of the propellant contained in the 1st combustion chamber.

In a preferred manner, the gas generator is unblocked by translational movement of a neck unblocking device, the movement of which is generated by the pressure in the 1st combustion chamber of the generator, as soon as said pressure reaches a threshold level allowing a calibrated pin to be sheared.

The device according to the invention makes it possible to provide a first inflating phase lasting 60 ms at most, preferably between 30 and 50 ms; then a second phase maintaining inflation lasting at least a few seconds, preferably at least 4 s, more preferably still between 5 and 8 s.

The protective device according to the invention may be used by the driver of a two-wheeled vehicle or other motor vehicle, in particular motorcyclists, quad bike users, side-car users, etc. It is also possible to envision utilization in any other risky activity, such as horse riding or certain activities within the building trade. In this application, the term person denotes the user or person to be protected and the term vehicle denotes the support for the person, such as a vehicle, motorcycle or the like, or a horse.

The protective airbag may be of variable dimensions and of any shape suitable for utilization and for the person, and which can easily be determined by a person skilled in the art. For a motorcyclist, it preferably covers the neck, the chest and part of the back of the person. It will be made of any suitable material known to a person skilled in the art, in particular of polyamide fabric sealed by a PVC or polyurethane coating.

In a preferred embodiment, the airbag will allow simple inelastic damping of the fall, thereby preventing rebounds. This is because, under the compressive stress created by the shock, the structure of the device is deformed and the pressure increases. The effect on the body of the person is thus violent and it is followed by a possible rebounding phase during the fall. To avoid these two phenomena, the device according to the invention will therefore preferably comprise one or more damping vents, also called unblocking vents, for unblocking at a threshold pressure. By ejecting part of the gas above said threshold pressure, the stresses on the person's body and the rebound effects are limited. These vents are preferably made of an elastomer. They preferably have prescored lines to ensure a regularized break.

In a preferred embodiment, the means of activating the dual stage gas generator is electronic, and comprises a sensor-transmitter module placed on the vehicle which transmits information to a receiver-igniter module placed on the person. The sensor-transmitter module comprises a component or detector for detecting an accident (sensor), and a component for transmitting a signal (transmitter). The receiver-igniter module comprises a component for receiving the signal transmitted by the sensor-transmitter module (receiver), and a component for activating inflation (ignition). The transmission between these two modules is preferably carried out by a radio-encoded link, but it is also possible to envisage another type of link, for example a wire link.

In the case of a wire link, said wire link serves only to transmit the information between the two modules, and, if it is broken or disconnected in the event of a fall, this does not activate ignition of the gas generator. Therefore, in this case, it does not have the function of the wire connections of the prior art, which constitute the means for igniting the gas generator.

One or other of the modules comprises a discriminating component, that is to say for analyzing information transmitted by the sensor. The activation or nonactivation of the generator is the result of a comparison of information detected with respect to threshold values of one of more parameters.

The receiver-igniter module will preferably be placed in the casing of the dual stage gas generator.

In a preferred embodiment of the invention, the sensor or detector for detecting an accident consists of a triaxial accelerometric sensor placed on the motorcycle, with axis Ox (horizontal axis of the earth's coordinate system and along the longitudinal axis of the motorcycle), axis Oy (horizontal axis of the earth's coordinate system and along the transverse axis of the motorcycle), and axis Oz (vertical axis of the earth's coordinate system). Depending on the type of accident, head-on or side impact between the vehicle and a stationary or moving object, uncontrolled skidding of the vehicle, etc., the information coming from one or other axis will be used.

In particular, in the case of an impact between the vehicle and a stationary or moving obstacle, it is the information on the Ox and Oy axes which is used. According to the invention, the discrimination will then take place mainly according to two thresholds:

a) level of deceleration greater than the thresholds $\Gamma ys$ and $\Gamma xs$, and b) level of the integral of the deceleration above thresholds $\Gamma ys$ and $\Gamma xs$ greater than a threshold Is and calculated over time sequences.

When the motorcycle skids or falls sideways, it is the information on the Oy and Oz axes which is used. According to the invention, the discrimination will then take place mainly according to two thresholds:

a) level of the ratio $\Gamma_1 = \Gamma ys/\Gamma zs$ or $\Gamma_2 = \Gamma zs/\Gamma ys$ above a threshold ratio $\Gamma_s$ with filtering of the "interference" frequencies due to jolting of the motorcycle on uneven roads and to inclinations desired by the riders in order to change course, and b) level of integral of the ratios $\Gamma_1$ and $\Gamma_2$ greater than the threshold ratio $\Gamma_s$ calculated over a time sequence.

In one embodiment of the invention, in order to avoid activation when tilting the motorcycle on stopping or at low speed, the discriminating component of the means for activating the gas generator will take into account a parameter for not activating the device, that is to say a value of the speed V of the motorcycle greater than a threshold speed $V_s$. In contrast, this nonactivating parameter will not be taken into account in the case of a shock, since the latter may occur when the vehicle is stationary, by rear or side impact from a moving obstacle.

In some cases, several persons may use the same vehicle. It is then beneficial to be able to use this vehicle fitted with the sensor-transmitter module with several receiver-ignition modules each worn by a different person. Problems of recognizing the modules may then arise. Consequently, in a preferred embodiment, the sensor-transmitter module is further equipped with a component for producing a code, and the receiver-igniter module is also equipped with the components for acquiring the code. On each first contact between a sensor-transmitter module and a receiver-igniter module, the code will be transmitted from one module to the other, which will allow mutual recognition, so as to allow efficient transmission of information between the two modules during utilization of the protective device. So as to avoid disturbance to the other equipment items which may be close by, the encoding operation is carried out, according to the invention, preferably by means of a wire link at the output of the component producing the code.

Activation of the generator may also take place by any suitable means other than electronic means. In particular it could be carried out by breaking or tensioning the wire link, although such an embodiment is not preferred for the reasons detailed above.

The protective device may be positioned in a fixed or detachable manner on, or in, the clothing worn by the person, in particular in a vest.

All the elements constituting the gas generator of a device according to the invention are preferably made of a composite material or a thermoplastic mechanically or thermally strengthened by fibers or powders. In a preferred embodiment, the device according to the invention comprises a functionality indicator, in particular a visual and/or audible indicator, so that the person is able to verify, for example at the start of utilization or periodically during utilization, that the device operates correctly. By way of example, this indicator may be a component of the means of activating the gas generator.

The dual stage comprises a 1$^{st}$ inflating phase lasting 60 ms at most, and a 2$^{nd}$ phase maintaining inflation lasting at least 4 s. The 1$^{st}$ inflating phase may last between 30 and 50 ms. The 2$^{nd}$ phase may last between 5 and 8 sec. The airbag further comprises one or more damping vents (110), wherein the damping vent is made of an elastomer, or may have prescored lines. A schematic representation of the vent (110) is shown in FIG. 4.

Figure 2:
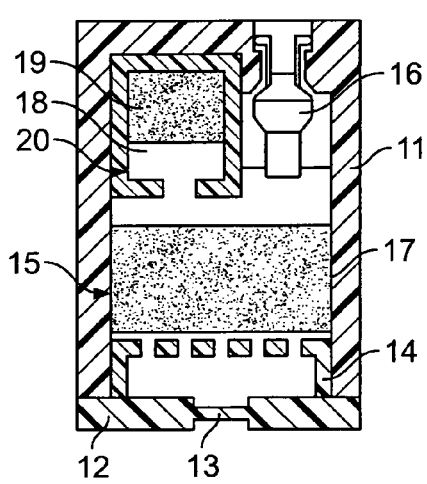
Figure 3:
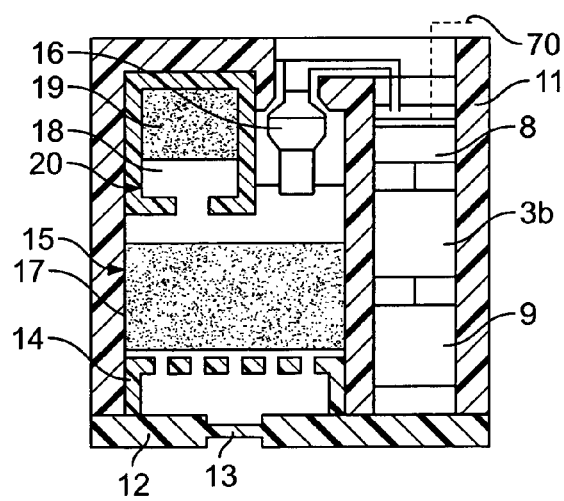
Figure 4:
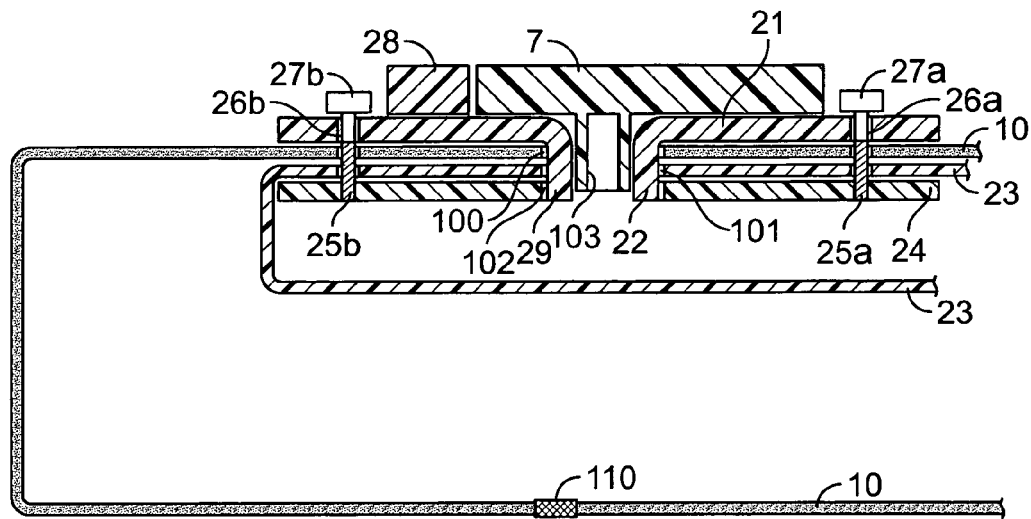
Figure 5:
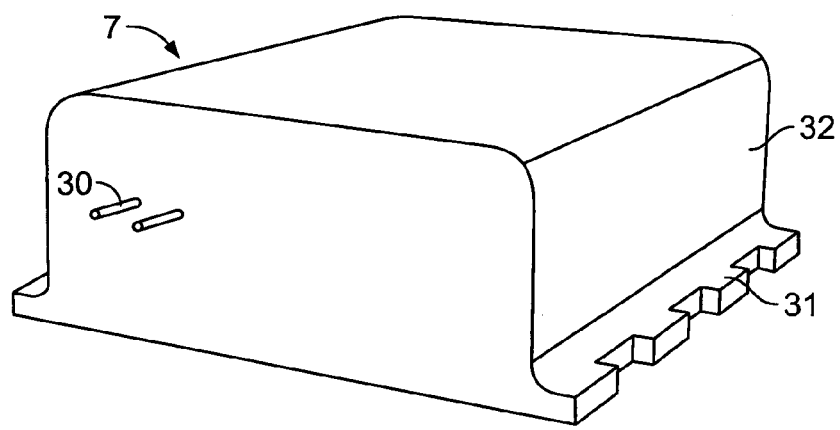
Figure 6:
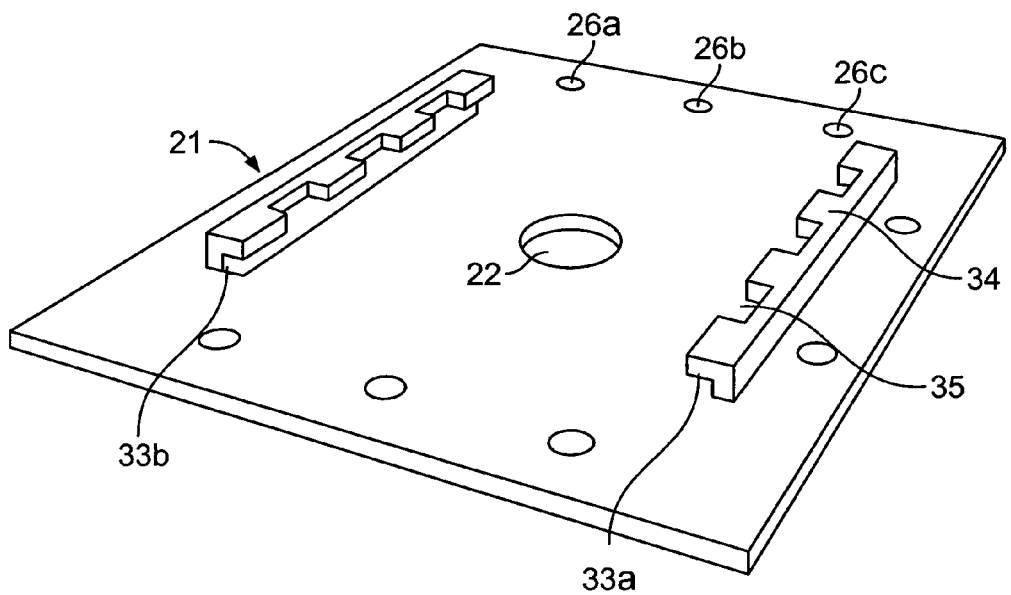
Figure 7:
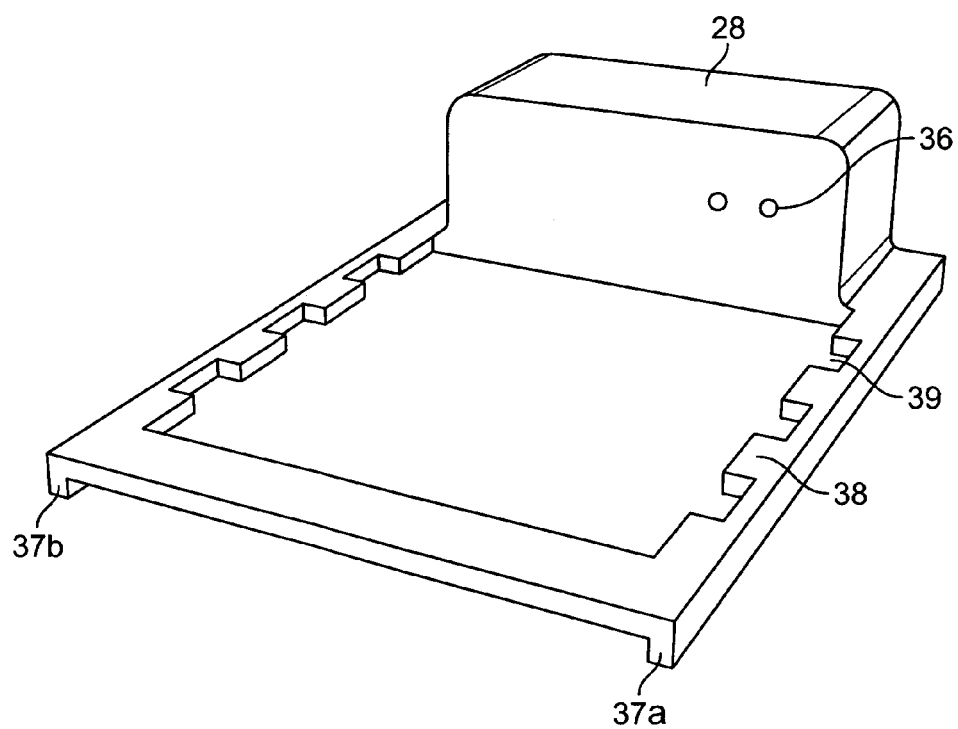
Figure 8:
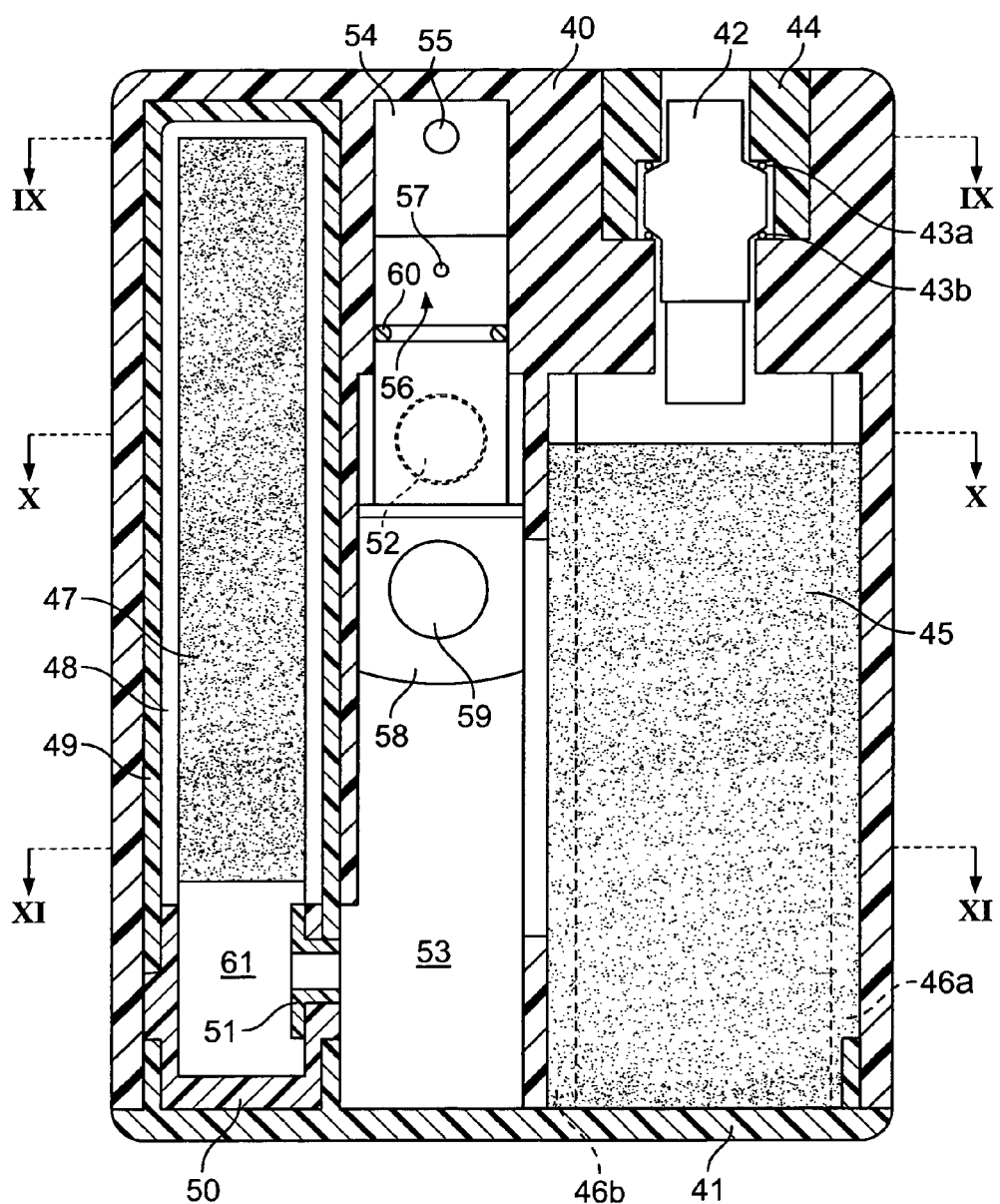
Figure 9:
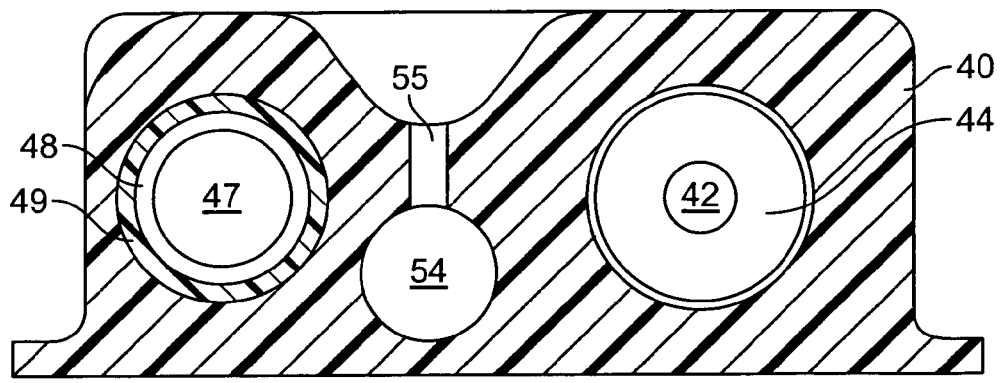
Figure 10:
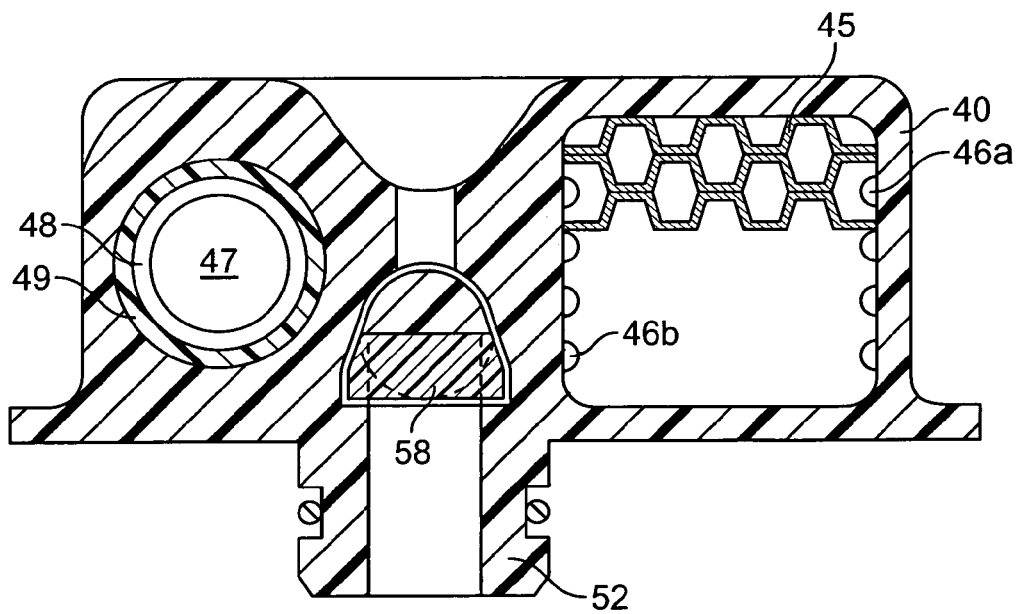
Figure 11:
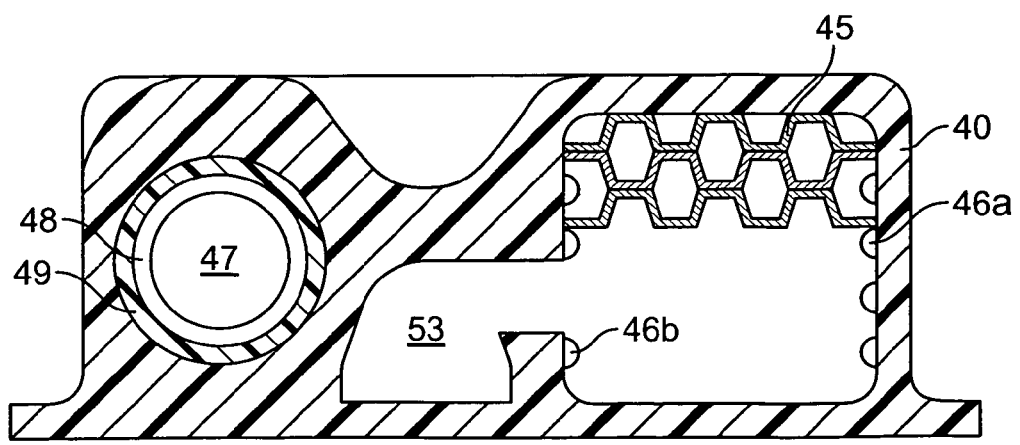

The invention will now be described in more detail by means of the figures hereafter, in which:

FIG. 1 shows very schematically the various elements comprising a protective device according to the invention, FIG. 2 shows a sectional view of a gas generator according to the invention, FIG. 3 shows a sectional view of a gas generator according the invention, the casing of which contains the receiver-igniter module, FIG. 4 shows the gas generator/airbag interface in a protective device according to the invention, FIGS. 5, 6 and 7 are perspective views of the three parts of the gas generator/airbag interface of FIG. 4, FIG. 8 is a longitudinal section of the gas generator of a protective device according to the invention, FIGS. 9, 10 and 11 are three transverse sections of the gas generator of FIG. 8, on lines IX—IX, X—X, and XI—XI, respectively.

As shown in FIG. 1, the protective device according to the invention comprises a means for activating the gas generator comprising an electronic sensor-transmitter module and an electronic receiver-igniter module. The sensor-transmitter module, placed on the vehicle, comprises the following components: a triaxial acceleration detector (1), an electronic processing and accident discrimination module (2), a radio-encoded transmitter (3a) and its component for carrying out the encoding, a functionality visual and/or audible indicator subassembly (5), and a power source (6) (for example cell or battery). The receiver-igniter module comprises the following components: a radio-encoded receiver (3b) and its component for acquiring the encoding, a power source (9), and an electronic module (8) for activating ignition of the generator (7). This module, together with the dual stage pyrotechnic gas generator (7) and the airbag (10), are placed on the person.

The link (4) between the module placed on the vehicle and the module placed on the person is, in this embodiment, a radio-encoded link.

The gas generator shown schematically in FIG. 2 makes it possible to explain the principle of operation of the dual stage. This generator comprises a casing (11) closed by a lid (12) equipped with a prescored blocking device (13). This lid supports the diffuser (14). The 1st stage combustion chamber (15) contains the electric safety igniter (16) and the propellant (17), the combustion of which generates the gases intended to rapidly inflate the airbag. The 2nd stage combustion chamber (18) contains the propellant (19), the combustion of which generates the gases intended to maintain the pressure in the airbag. The evenness of the 2nd stage combustion is ensured by the small neck (20). In the pressure maintenance phase, the 1st stage combustion chamber becomes an expansion chamber.

The generator may contain the electronic elements of the receiver-igniter module, as shown schematically in FIG. 3, in a housing connected to the 1$^{st}$ stage chamber (15). These elements are the radio receiver (3b), the activating module (8) and the power source (9). Alternatively, a connecting wire (70) is used instead of the radio receiver (3b). FIG. 3 shows a schematic representation of the wire (70).

In the embodiment shown in FIG. 4, which is a specific embodiment, the interface between the airbag (10) and the gas generator (7) comprises:

a platen (21), preferably made of a fiber-glass-filled plastic. This platen comprises, in particular, a centering tube (22) which serves to position all the elements with respect to each other, the fabric of the airbag (10), a wall of a protective case (23), which is preferably made of a heat protected fabric but which may also be a stiff plastic part strengthened by an insulating filler, a back plate (24), preferably made of fiber-glass-filled plastic. This back plate comprises pegs (25a, 25b, etc.) which pass through orifices (26a, 26b, etc.) of the platen (21) in order to receive the fastenings (27a, 27b, etc.). These fastenings are preferably nuts made of filled plastic, but it is also possible to use other types of nuts or else a riveting or snap riveting device. Openings 100, 101 and 102 are shown, as well as a seal 103.

The electronic module (28), comprising a power source, slides into the platen (21). The gas generator (7) itself is also positioned in the platen (21) via the tube (22) in which the outlet from the neck (29) and a seal are housed.

FIG. 5 shows a perspective view of the gas generator (7) of the-protective device of FIG. 4. The generator comprises, on the rear face, the plugs (30) for connecting the igniter of the generator and, on the sides, the teeth (31) of the generator casing intended to lock the casing (32) to the platen.

FIG. 6 shows a perspective view of the platen (21) of the device of FIG. 4. It comprises the two grooves (33a, 33b) for locking the gas generator, equipped with their teeth (34) and with their notches (35). It also comprises the centering tube (22) and the various holes (26a, 26b, etc.) intended for the pegs (25a, 25b, etc.) to pass through the back plate (24).

FIG. 7 shows a perspective view of the electronic module (28) of the device of FIG. 4. It comprises the socket (36) for connecting the plugs (30) of the gas generator igniter. It also comprises the frame for locking the gas generator (7) onto the platen (21). This frame consists of two strips (37a, 37b) which are positioned in the grooves (33a, 33b) of the platen (21). These two strips have teeth (38) and notches (39).

The airbag-generator assembly is fastened as follows:
a) the back plate (24) is inserted into the protective casing (23),
b) this assembly is inserted into the airbag (10),
c) the platen (21) is positioned by using the centering tube (22) in the main hole of the fabric,
d) the pegs (25a, 25b) are inserted into the corresponding holes of the airbag (10) and into the corresponding holes (26a, 26b) of the platen (21) and clamped by means of nuts (27a, 27b),
e) the strips (37a, 37b) of the electronic module (28) are slid into the grooves (33a, 33b) of the platen by superimposing the teeth of these two parts,
f) the gas generator (7) is mounted in the assembly above by introducing the neck outlet tube (29) into the centering tube (22), and the teeth of the gas generator casing (31) are slid into the notches (35, 39) of the platen (21) and of the electronic module (28),
g) the electronic module (28) is pushed towards the gas generator until in contact; this has the effect of closing the notches (35) of the platen by means of the teeth (38)

of the electronic module (28) and of inserting the plugs (30) of the generator igniter into the socket (36) of the electronic module (28).

The gas generator of a protective device according to the invention, and the operation of this generator, will be described below, with reference to FIGS. 8 to 11, which describe a specific exemplary embodiment, FIGS. 9 to 11 being sectional views of the generator of FIG. 8, at different levels (lines 9—9, 10—10 and 11—11 respectively).

The generator consists of the following elements:
a) a body (40) and a plug (41), preferably made of thermoplastics filled with long fibers, (glass or aramid fibers). It is also possible to use filled heat shrinkable materials, or composite materials or even metals,
b) an electric igniter (42) equipped with two seals (43a, 43b) locked by the nut (44) of the igniter (42), preferably made of thermoplastics filled with long fibers,
c) the propellant charge (45) of the $1^{st}$ combustion stage. The propellant is in the form of plates embossed by knuckles, stacked and held by bosses (46a, 46b) included in the body (40) or the plug (41),
d) the propellant charge (47) of the $2^{nd}$ stage, which is the in the form of a rod included in an inhibitor (48). The assembly is placed in a charge casing (49) and its plug (50) is preferably made from a fiber-glass-filled thermoplastic. The neck (51) is preferably made of a recalcitrant material,
e) the device for opening a neck (52). In order to prevent any ejection from a blocking device allowing the pressure to rise in the combustion chamber (53), according to the invention, a pusher-based neck unblocking device is used. This unblocking device consists of a housing (54) having an anti-dashpot vent (55). The unblocking device (56) is designed to slide in the housing (54) under the effect of the pressure in the chamber (53). Its movement is initiated at a desired pressure in the chamber (53) by breakage of the calibrated pin (57). The tongue (58) of the unblocking device (56) moves and the orifice (59) is positioned to the right of neck (52). The pressure in the chamber keeps the unblocking device in the open position throughout the entire option of the gas generator. Sealing is provided by the seal (60).

The operation of the dual stage gas generator is described below. Under the effect of an electric pulse delivered by the electronic system and its power source contained in the electronic module (28), the igniter operates and generates hot gases which ignite the propellant in the charge (45) of the $1^{st}$ stage. The pressure increases in the chamber (53), the unblocking device (56) releases neck (52) and the gases produced by combustion of the propellant (45) pass through neck (52) and rapidly inflate the airbag (10). The hot gases produced by the propellant (45) enter the chamber (61) of the propellant block (47) of the second stage, igniting it. After combustion of the propellant (45) of the $1^{st}$ stage is completed, which is made possible to rapidly inflate the airbag, the combustion of the propellant block 47) of the $2^{nd}$ stage ensures, by means of a low, lasting flow rate, that the pressure of the inflatable structure is maintained.

The invention claimed is:

1. A protective device comprising an airbag worn by a person, a pyrotechnic gas generator for inflating the airbag, and means for activating the gas generator, the gas generator having a first combustion chamber containing a first propellant ignited by an electric igniter, the gases produced by combustion of the first propellant rapidly inflating the airbag during a first inflating phase lasting 60 ms at most, and a second combustion chamber containing a second propellant ignited by the hot gases generated by the combustion of the first propellant contained in the first combustion chamber, the combustion of the second propellant ensuring by means of a low, lasting flow rate, a second inflating phase maintaining inflation lasting at least 4 seconds.

2. The device as claimed in claim 1, wherein the gas generator is monoblock piece with single ignition.

3. The device as claimed in claim 1, wherein, each combustion chamber is equipped with a neck for regulating the flow rate.

4. The device as claimed in claim 1, wherein the first inflating phase lasts between 30 and 50 ms.

5. The device as claimed in claim 1, wherein the second phase lasts between 5 and 8 s.

6. The device as claimed in claim 1, wherein the means for activating the gas generator is electronic.

7. The device as claimed in claim 6, wherein the means for activating the gas generator comprises a sensor-transmitter module placed on a vehicle which transmits information to a receiver-igniter module placed on the person, either of these modules comprising a discriminating component.

8. The device as claimed in claim 7, wherein information is transmitted between the two modules by a radio-encoded or wire link.

9. The device as claimed in claim 7, wherein the sensor-transmitter module comprises a sensor component consisting of a triaxial accelerometric sensor.

10. The device as claimed in claim 7, wherein information is transmitted between the two modules by a radio-encoded link, the sensor-transmitter module being equipped with a component for producing the code, and the receiver-igniter module being equipped with a component for acquiring the code.

11. The device as claimed in claim 1, wherein the means for activating the gas generator comprises a discriminating component taking into account a parameter for not activating the gas generator, consisting of the value of the vehicle speed greater than a threshold speed in the absence of a shock.

12. The device as claimed in claim 1, wherein the various elements forming the gas generator are materials chosen from the group consisting of composite materials and thermoplastics filled with fibers or powders.

* * * * *